Oct. 25, 1932.  W. JOHN  1,884,975
TRAILER DRAFT GEAR
Filed May 14, 1931   3 Sheets-Sheet 1
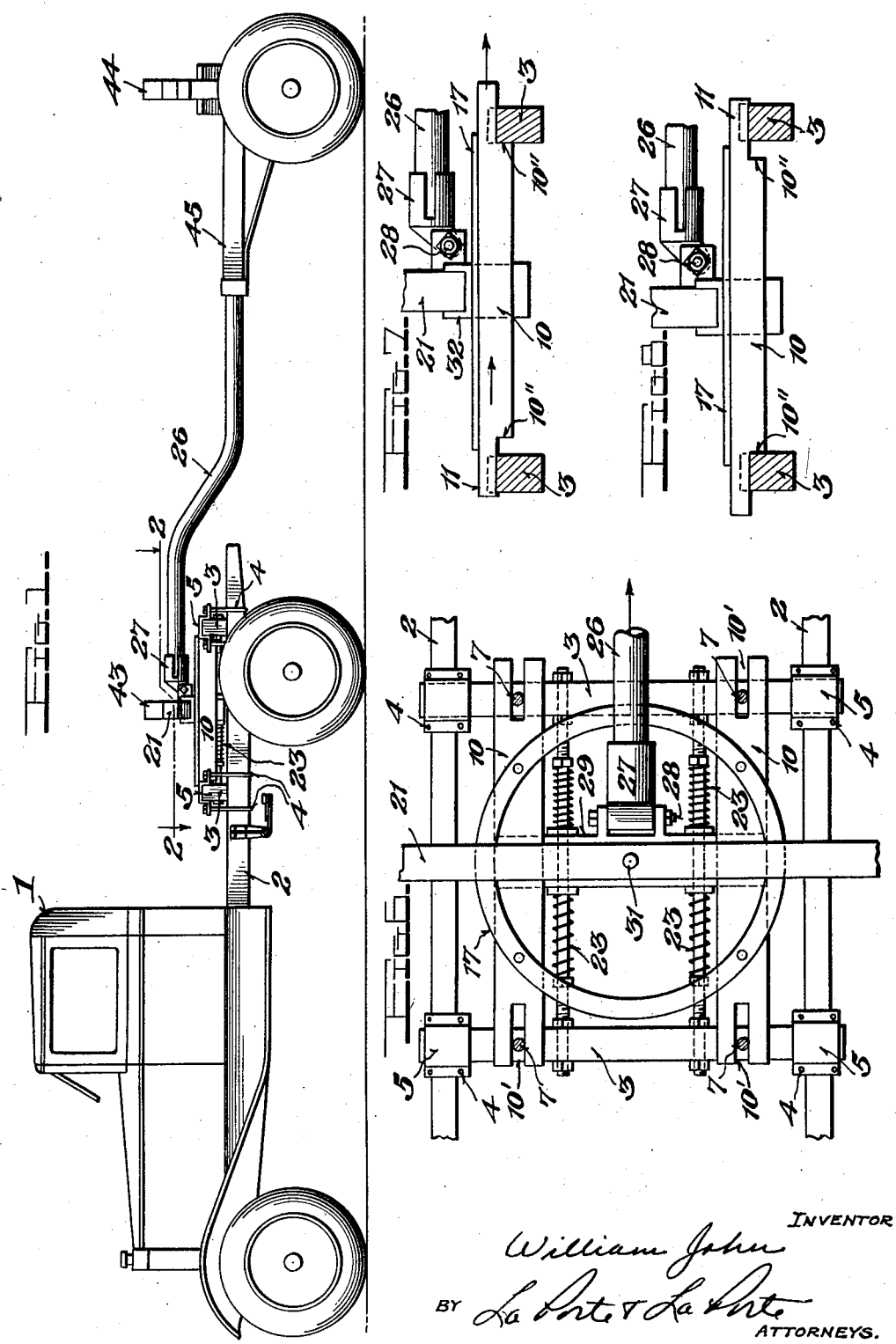
INVENTOR
William John
BY La Porte & La Porte
ATTORNEYS.

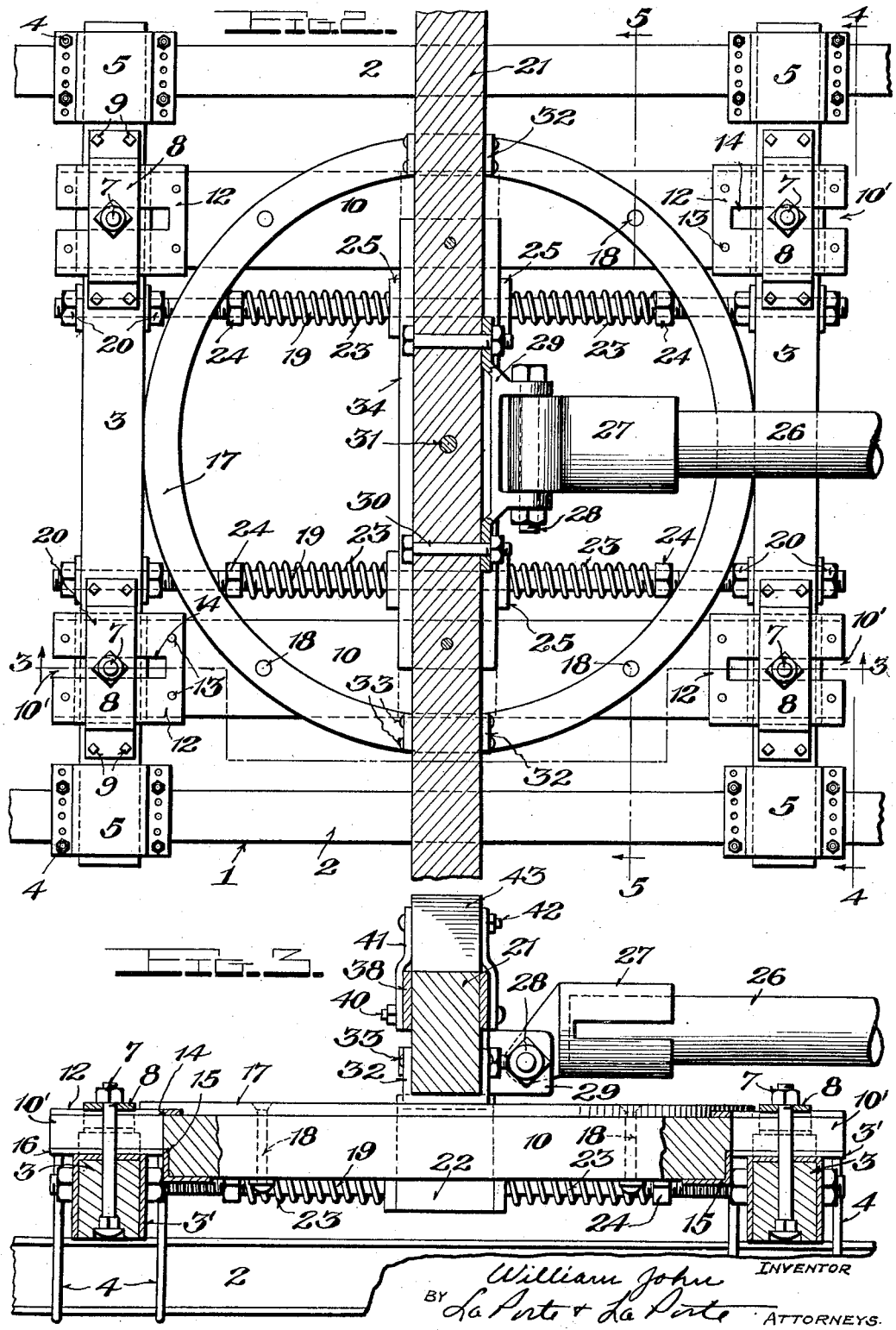

Oct. 25, 1932.   W. JOHN   1,884,975
TRAILER DRAFT GEAR
Filed May 14, 1931   3 Sheets-Sheet 3
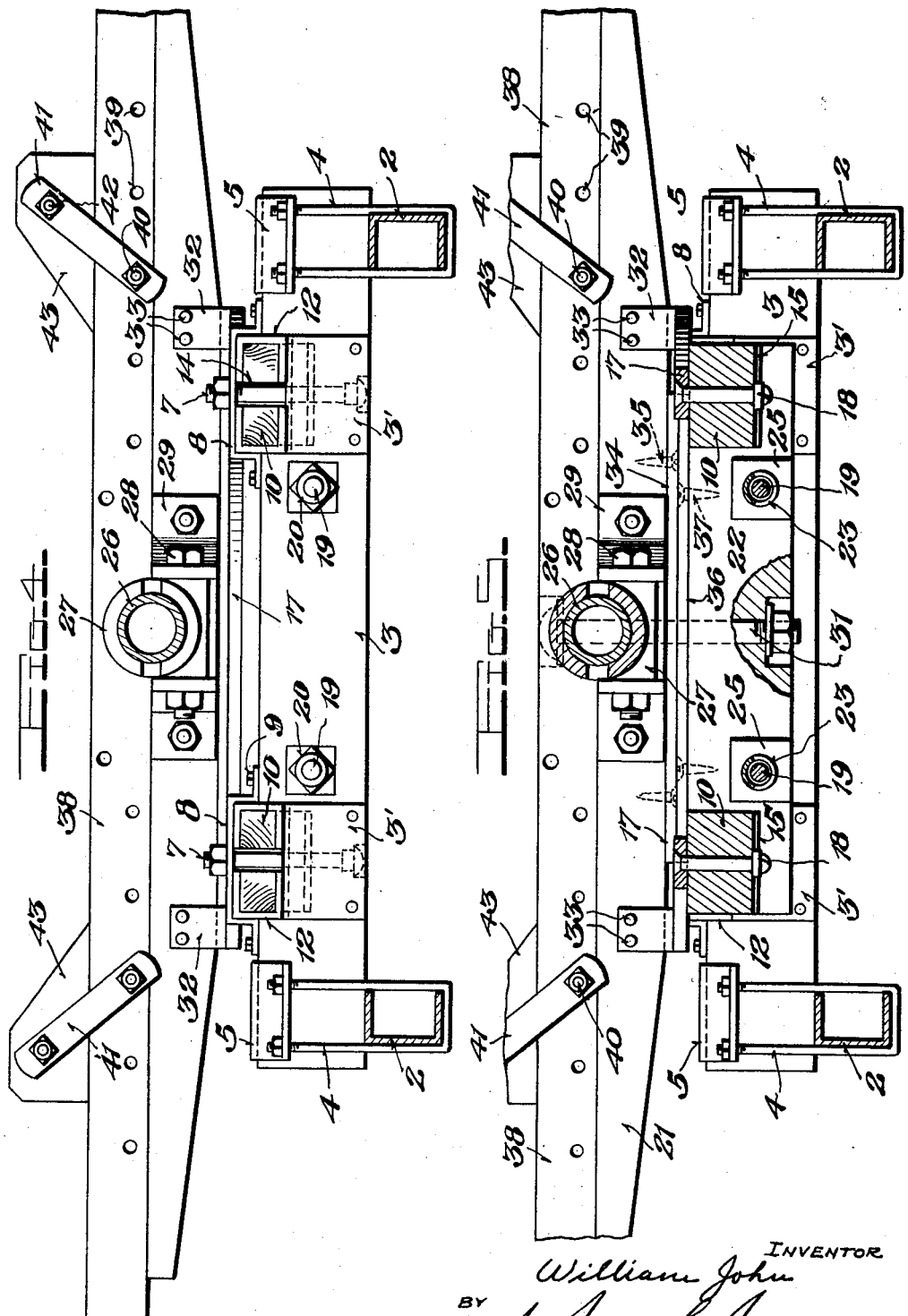

Patented Oct. 25, 1932

1,884,975

UNITED STATES PATENT OFFICE

WILLIAM JOHN, OF PEKIN, ILLINOIS, ASSIGNOR TO PEKIN WAGON COMPANY, OF PEKIN, ILLINOIS, A CORPORATION OF ILLINOIS

TRAILER DRAFT GEAR

Application filed May 14, 1931. Serial No. 537,256.

This invention has reference to improvements in trailer draft gear for towing vehicles and the principal object thereof is to provide an improved means whereby trailers or other like vehicles may be conveniently and readily connected to the towing or leading vehicle in such manner as to cushion and absorb the shocks and jars resultant in starting and stopping, and in such a manner that both the towing vehicle and trailer may ride freely over rough roads or road obstructions without injuring or straining the parts.

A further and important object of the invention is to provide a draft appliance for attachment to the frame or chassis of towing vehicles comprising a supporting frame and a bolster support adapted for sliding movement within said frame, said slidable bolster support and frame provided with shock absorbing mechanism and means for permitting free turning of the bolster on and during sliding of the support within the frame, said support and frame further including means to restrict the sliding movement of the former within the latter.

The invention has for a still further object to provide a mechanism of this type which can be applied to the frame or chassis of towing vehicles of varying widths, which is of a simple and compact construction, reliable and efficient in operation and which also can be easily and quickly applied to the towing vehicle.

Other and further objects will appear from the following description.

That the invention may be more fully understood, reference is had to the accompanying drawings forming a part of this description, illustrating a preferred embodiment of the invention, in which:—

Fig. 1 is a side elevation of my invention shown applied to the frame or chassis of a towing vehicle, such as a motor truck, and connected thereto a trailer chassis;

Fig. 2 is an enlarged sectional view in plan as the same would appear if taken on the line 2—2, of Fig. 1;

Fig. 3 is a sectional view in elevation as the same would appear if taken on the line 3—3, of Fig. 2;

Figs. 4 and 5 are sectional end views as the same would appear if taken on the lines 4—4 and 5—5, respectively, of Fig. 2;

Fig. 6 is a top plan view, similar to Fig. 2, except that some of the parts have been omitted to more clearly illustrate the structure, and to further show the position the shock absorbing mechanism would assume when actuated with respect to the chassis or frame of the towing vehicle; and Figs. 7 and 8 are diagrammatical views, partly in section, showing the range of movement of the shock absorbing mechanism with respect to the chassis of the towing vehicle.

Like characters of reference denote corresponding parts throughout the figures.

Reference now being had to the drawings, the towing vehicle generally designated at 1 has its usual frame or chassis members 2 extended rearwardly. A pair of supporting bars 3 comprising a frame are adapted to be seated upon the chassis members 2 of the towing vehicle and are rigidly clamped thereto by means of pairs of U-shaped bolts 4 that are connected to caps 5. The caps 5 which secure the bars 3 on the chassis or frame extensions 2 are provided with a plurality of holes through which the U-shaped bolts may have securement whereby to accommodate chassis or frame members of towing vehicles of different and varying widths, as will be understood.

As shown in Fig. 3 of the drawings, the bars 3 are provided with U-shaped wear plates 3' through which pass bolts 7, the latter having securement in the bars 3 and extending through guide clips 8 which are of U-shape and are secured to the bars 3 by means of the fastenings 9 passing through the out-turned ends of said clips, see Figs. 2 and 4.

A pair of beams 10 are mounted to slide between the bars 3, the extent of such slidable movement being indicated in Figs. 7 and 8. The beams 10 have narrowed extensions 11 at their ends which are slotted at 10' whereby to receive and have slidable relation with the bolts 7 and to be slidably supported by the bars 3. Wear sleeves 12 are secured by suitable means, such as screws 13, see Fig. 2, to the beams 10 and have slots 14 corresponding to the slotted portions 10' of the beams 10 and are adapted to secure the bolts 7 so as to permit free sliding movement of the beams 10. The wear plates 12 have L-shaped extensions 15 which are slotted at 16 to receive the bolts 7 as shown in Fig. 3, the wear plates slidably engaging the tops of the U-shaped wear plates 3' which overlie the upper faces of the bars 3.

A fifth wheel ring track is secured by bolts 18 to the beams 10 so that the bolster, track and beams, when displaced by stopping and starting or jerking movements, move together as a unit on the bars 3.

Guide rods 19 are secured by nuts 20 to the bars 3 for purposes of rigidity and extend parallel to the beams 10, see Figs. 2 and 3. A bolster 21 extends transversely of the beams 10 and overlies a bar 22 formed with openings through which the rods 19 extend. Said bar 22 is suitably disposed between the beams 10 and has its opposite ends preferably mortised to accommodate its fixed attachment to the beams 10, see Fig. 5. Coil springs 23 are mounted on each of the rods 19, being disposed thereon between the bars 2 and 22, respectively, and at their outer ends abut against tension adjusting nuts 24 threadably secured to the rods 19 while their inner ends abut wear washers 25 which bear against opposite faces of the bar 22.

A draft bar 26 is shown having a pivotal connection to a coupling 27, the latter secured by a bolt 28 which is carried by a bracket 29 that is suitably bolted at 30 to the bolster 21. A king pin 31, see Fig. 5, extends through the bar 22 and the bolster 21 and not only connects these parts but further provides a pivotal connection for the bolster. As shown in Figs. 3 and 5, the underside of the bolster 21 is provided with a pair of U-shaped bearing members 32 affixed thereto by fastenings 33, said members adapted to ride upon the track 17 during pivotal movement of the bolster about the king pin 31, and further, to prevent up and down swaying or sagging of the bolster upon the track. A bracing and wear plate 34 is secured to the under side of the bolster 21 by fastenings, such as screws 35, adapted to have pivotal relation to a bracing and wear plate 36 secured to the upper face of the bar 22 by suitable fastenings, such as screws 37, see Fig. 5.

The upper opposite side faces of the bolster 21 are provided with steel strips 38, which have a plurality of corresponding bolt holes 39 therein to receive bolts 40, the latter adapted for the purpose of pivotally anchoring connecting straps 41 that are connected by bolts 42 to adjustable stop or anchoring blocks 43 mounted upon the upper face of the bolster 21, said blocks corresponding to similar blocks 44 mounted on the bolster of the trailer 45, see Fig. 1.

Referring to Figs. 7 and 8, it will be observed that the ends 10" of the bars 10 are adapted to abut the inner side faces of the bars 3 when displaced by movements of the vehicle, whether it be a stopping or starting or jerking movement. Figs. 2 and 3 show the draft gear assembly at rest or in nonoperative position.

From the foregoing, it will be seen that upon the connecting end of the reach or draft bar 26 being subjected to a side-wise forward or backward movement by turning of the towing vehicle, said bar 26 will cause the bolster 21 through their connections to accommodate such side-wise forward or backward movement by pivoting of the bolster 21 on the king bolt 31 and in such pivotal movement, the bolster will be prevented from swaying or sagging by the riding of the bearing members 32 thereof upon the ring track 17. Whether the side-wise movement of the towing vehicle be of a forward or backward movement, it will be understood that such shock or jerk incidental thereto, or if caused by uneven road conditions, that there will be an absorption or cushioning effect realized by a sliding movement of the beams 10 in relation to the bars 3, and that the parts comprising the bar 26 and towed trailer 45, bolster 21, bar 22, beams 10 and ring track 17 move as a unit in such sliding movement of the beams 10 in relation to the fixed bars 3 as the result of such forward or backward movement of the towing vehicle, and that such sliding movement is arrested or checked by the resistance of the coiled springs 23 and the abutting edges 10", the latter stopping and limiting such movement of the movable parts hereinabove referred to by abutting against the inner side faces of the bars 3, whether such sliding movement be of a forward or backward nature, see Figs. 7 and 8. It will be further understood that the movable parts of this assembly are as equally efficient and effective in functioning to absorb jerks, starting and stopping movements of the towing vehicle, or uneven movements caused by rough road bed in straight-like forward or backward movements as distinguished from turning movements. In either case, the bolster 21 and its bearing members 32 are at all times in proper bearing relation with the ring track 17 and all move together as a unit during the sliding movement of the beams 10 when so actuated by starting or stopping of the load, or caused by uneven road conditions.

Referring to Fig. 7, it will be observed that a pulling or forward movement of the load through the bar 26 will cause a sliding movement of the beams 10 and the associated parts 21, 32 and 17 and the rear ends of the beams 10 caused to abut the inner face of the rear bar 3, thus limiting the extent of movement of the reach or draft bar 26, and during which movement the rearmost springs 23 will be compressed as shown in Fig. 6, whereas the foremost springs are permitted to expand, thus functioning to retard and cushion the sliding movement of the beams 10 until arrested or stopped by the bars 3, providing the extent of movement caused by the starting or stopping of the load or jerking by reason of uneven road conditions is sufficient or of such force to overcome the set resistance of the springs 23 to cause the abutting faces 10″ to function in preventing further movement of the beams 10 by abutting against the bar 3. Likewise and upon the load through the draft bar 26 being subjected to a pushing or backward movement by the towing vehicle, the opposite ends of the beams 10 will be caused to move towards the forward bar 3 with the result that the forward springs are caused to be compressed and the rear springs allowed to expand whereby to cushion such movement of the beams 10 until arrested by the engagement of the forward abutting ends 10″ with the inner face of the front or forward bar 3, see Fig. 8.

Upon the towing vehicle and load carried by the trailer being relieved of such straining movements, such as starting and stopping, or jerks incident to uneven road conditions, whether it be a forward or rearward movement as illustrated in Figs. 7 and 8, the beams 10 will be caused to assume their normal position as illustrated in Figs. 2 and 3 with respect to the bars 3 by reason of the action of the springs 23 seeking their relative balance to each other. The springs 23 are adapted for tension adjustment with respect to each other by the nuts 24, however, it is intended that each of the coiled springs be so adjusted as to equalize the opposing coiled springs whereby the opposite abutting faces 10″ of the beams 10 shall be equidistantly disposed from the inner respective faces of the forward and rear bars 3, as shown in Figs. 2 and 3, thereby permitting equal distances of travel of the beams 10 in their forward and rearward movement to overcome and absorb the shocks and jars incident to starting or stopping of the load, or jerks while the load is in motion incident to an uneven roadbed.

What I claim is:—

1. In a device of the character described, supporting means for attachment to a vehicle, a slidable carrier connected to the supporting means, a ring track secured on the carrier, a bolster mounted for pivotal movement on the track, a support for the bolster connected to the carrier, a king bolt pivotally connecting the bolster to said support, cushioning means carried by the supporting means and bolster support, and draft connections on said bolster.

2. In a device of the character described, supporting means for attachment to a vehicle, a slidable carrier connected to the supporting means, a ring track secured on the carrier, a bolster on the track, draft connections on said bolster, means to mount the bolster for pivotal movement on said track and permit the bolster and carrier to move as a unit during the slidable movement of the carrier, and cushioning means for said mounting means to cushion the sliding movement of said bolster and carrier.

3. In a device of the character described, supporting means for attachment to a vehicle, a slidable carrier connected to the supporting means, a ring track secured on the carrier, a bolster on the track, draft connections on said bolster, means to mount the bolster for pivotal movement on said track and permit the bolster, track and carrier to move as a unit during the slidable movement of the carrier with respect to the supporting means, cushioning means for said carrier to cushion the latter in its sliding movements, and means on said carrier and supporting means to restrict the sliding movement of the carrier in opposite directions.

4. In a device of the character described, supporting means adapted for attachment to varying width chassis of vehicles, a carrier adapted for slidable movement in said supporting means, a ring track secured on said carrier, a bolster mounted for pivotal movement on said track, mounting means permitting movement of the bolster with the sliding movement of the carrier and during pivotal movement of the bolster, and cushioning means on opposite sides of the bolster and mounting means whereby to cushion the joint movement of said bolster and carrier in said supporting means.

5. In a device of the character described, supporting means adapted for attachment to varying width chassis of vehicles, a carrier adapted for slidable movement in said supporting means, a ring track secured on said carrier, a bolster mounted for pivotal movement on said track, mounting means permitting movement of the bolster with the sliding movement of the carrier and during pivotal movement of the bolster, and adjustable cushioning means on opposite sides of the bolster and mounting means whereby to cushion the joint movement of said bolster and carrier in said supporting means.

6. In a device of the character described, supporting means for attachment to a vehicle, a carrier adapted for slidable movement in said supporting means, a ring track secured on said carrier, a bolster on the track, draft bar connections on said bolster, means to mount the bolster for bodily slidable and pivotal movement with said carrier in said supporting means, cushioning means for said mounting means to cushion the latter in its sliding movements, and means to restrict the sliding movement of said mounting means in each direction.

7. In combination with a pair of spaced bars and means for attaching the same to a towing vehicle, a pair of spaced beams arranged for slidable connection between said bars and having their movement restricted by engagement with the bars, said beams having end extensions which slidably engage the upper faces of said bars, a bar disposed medially and transversely of the beams, a pair of spaced rods disposed through said bar and connected at their ends to the pair of bars, a pair of coil springs arranged for tension adjustment mounted on each rod and disposed between opposite sides of said transverse bar and the inner faces of the respective pairs of bars, a ring track secured to the upper faces of the beams, a bolster overlying said bar, a king bolt pivotally connecting the bolster to the bar, bearing members carried by the bolster and riding on said track, and draft bar connections on said bolster.

In witness whereof, I have hereunto affixed my hand this 8th day of April, 1931.

WILLIAM JOHN.